(12) United States Patent
Potu et al.

(10) Patent No.: US 12,323,337 B2
(45) Date of Patent: *Jun. 3, 2025

(54) INTEGRATED GATEWAY PLATFORM FOR FULFILLMENT SERVICES

(71) Applicant: Walmart Apollo, LLC, Bentonville, AR (US)

(72) Inventors: Shiva Krishna Potu, Milpitas, CA (US); Venkateswararao Chennamsetty, Dublin, CA (US); Dhruv Rajnikant Sojitra, Sunnyvale, CA (US); Madhavan Kandhadai Vasantham, Dublin, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,043

(22) Filed: Oct. 9, 2023

(65) Prior Publication Data

US 2024/0039862 A1 Feb. 1, 2024

Related U.S. Application Data

(63) Continuation of application No. 16/885,104, filed on May 27, 2020, now Pat. No. 11,784,938.

(51) Int. Cl.
*H04L 47/52* (2022.01)
*H04L 9/32* (2006.01)
*H04L 47/2416* (2022.01)
*H04L 47/2425* (2022.01)

(Continued)

(52) U.S. Cl.
CPC .......... *H04L 47/521* (2013.01); *H04L 9/3263* (2013.01); *H04L 47/2416* (2013.01); *H04L 47/2425* (2013.01); *H04L 47/781* (2013.01); *H04L 47/801* (2013.01)

(58) Field of Classification Search
CPC ............... H04L 9/3263; H04L 47/2416; H04L 47/2425; H04L 47/521; H04L 47/781; H04L 47/801
See application file for complete search history.

(56) References Cited

U.S. PATENT DOCUMENTS

7,788,145 B2 8/2010 Wadawadigi et al.
10,498,583 B1 * 12/2019 Davis .................. G06F 9/45558
11,093,912 B1 * 8/2021 Fakhraie ................. G06F 9/451
(Continued)

*Primary Examiner* — Jeong S Park
(74) *Attorney, Agent, or Firm* — BRYAN CAVE LEIGHTON PAISNER LLP (57) ABSTRACT

A system including one or more processors and one or more non-transitory computer-readable media storing computing instructions that, when executed on the one or more processors, cause the one or more processors to perform operations including: authenticating at least one source of online data transmissions that matches a respective computing device of a user; batching the online data transmissions into one or more micro-batches; transmitting the one or more micro-batches to one or more respective backend services; receiving respective responses from the one or more respective backend services in response to each one of the one or more micro-batches; and performing each respective task of one or more tasks associated with the respective responses. Other embodiments are disclosed.

20 Claims, 5 Drawing Sheets

(51) Int. Cl.
*H04L 47/78* (2022.01)
*H04L 47/80* (2022.01)

(56) References Cited

U.S. PATENT DOCUMENTS

| | | | |
|---|---|---|---|
| 11,784,938 B2* | 10/2023 | Potu | H04L 47/20 |
| | | | 709/232 |
| 2008/0028445 A1* | 1/2008 | Dubuc | H04L 63/0892 |
| | | | 726/5 |
| 2010/0228641 A1 | 9/2010 | Das et al. | |
| 2011/0320650 A1* | 12/2011 | Kida | G06F 3/05 |
| | | | 710/52 |
| 2012/0203538 A1* | 8/2012 | Tamosevicius | H04L 65/1053 |
| | | | 379/202.01 |
| 2013/0012168 A1* | 1/2013 | Rajadurai | H04W 12/04 |
| | | | 455/411 |
| 2017/0103435 A1 | 4/2017 | Saia et al. | |
| 2017/0111336 A1* | 4/2017 | Davis | H04L 63/029 |
| 2017/0286497 A1* | 10/2017 | Crabtree | H04L 67/12 |
| 2019/0149433 A1 | 5/2019 | Ramachandran et al. | |
| 2019/0306189 A1* | 10/2019 | Torgerson | H04L 9/3213 |
| 2020/0285464 A1* | 9/2020 | Brebner | G06F 8/36 |
| 2021/0117544 A1* | 4/2021 | Kurtz | G06F 21/566 |
| 2022/0026594 A1* | 1/2022 | Mohanty | G01V 11/00 |

\* cited by examiner

FIG. 5

INTEGRATED GATEWAY PLATFORM FOR FULFILLMENT SERVICES

CROSS-REFERENCE TO RELATED APPLICATIONS

The present application is a Continuation application of U.S. patent application Ser. No. 16/885,104 filed on May 27, 2020, and is herewith incorporated by reference in its entirety.

TECHNICAL FIELD

This disclosure relates generally to an integrated gateway platform for fulfillment services.

BACKGROUND

Conventional processes of receiving transmission communications can be contingent upon current network traffic rates at certain times during the day. Such processes can be time consuming due to the complexity of computer processes receiving thousands of data transmissions from multiple sources per minute of each day without losing or dropping information.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

Figure 1:
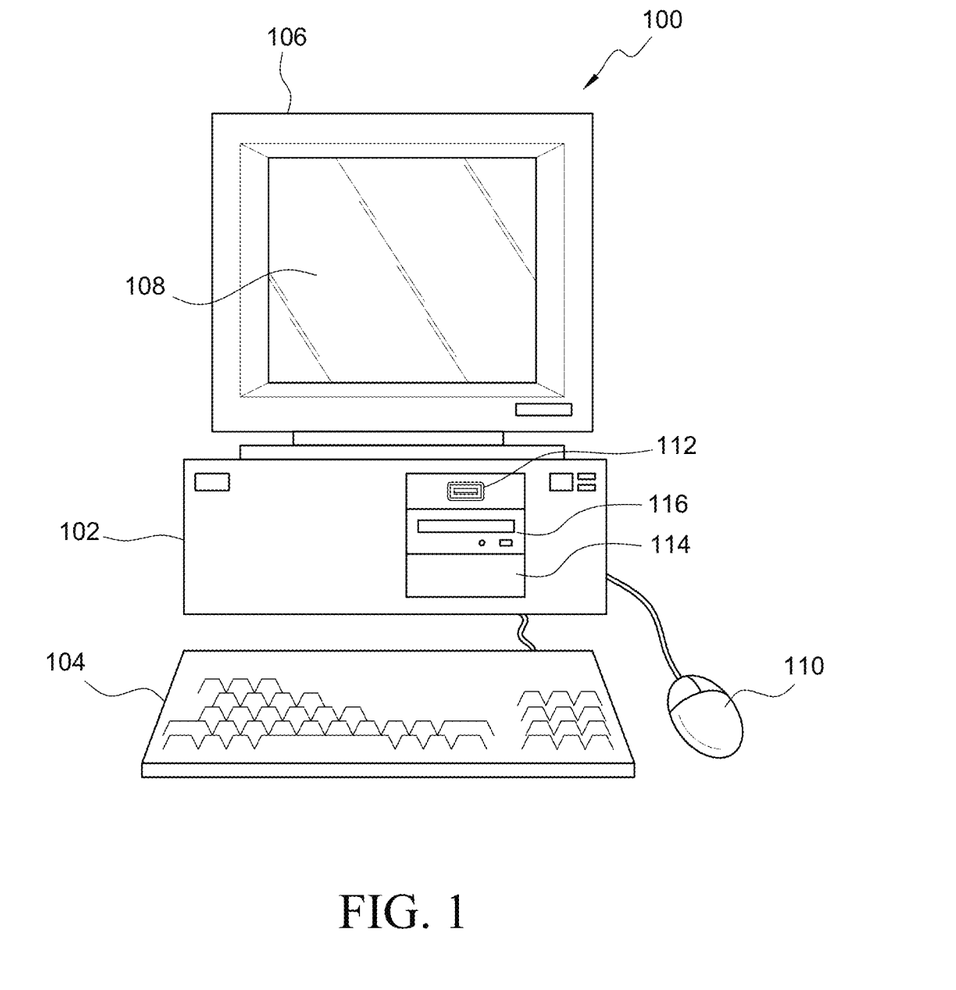
FIG. 1 illustrates a front elevational view of a computer system that is suitable for implementing an embodiment of the system disclosed in FIG. 3.
Figure 2:
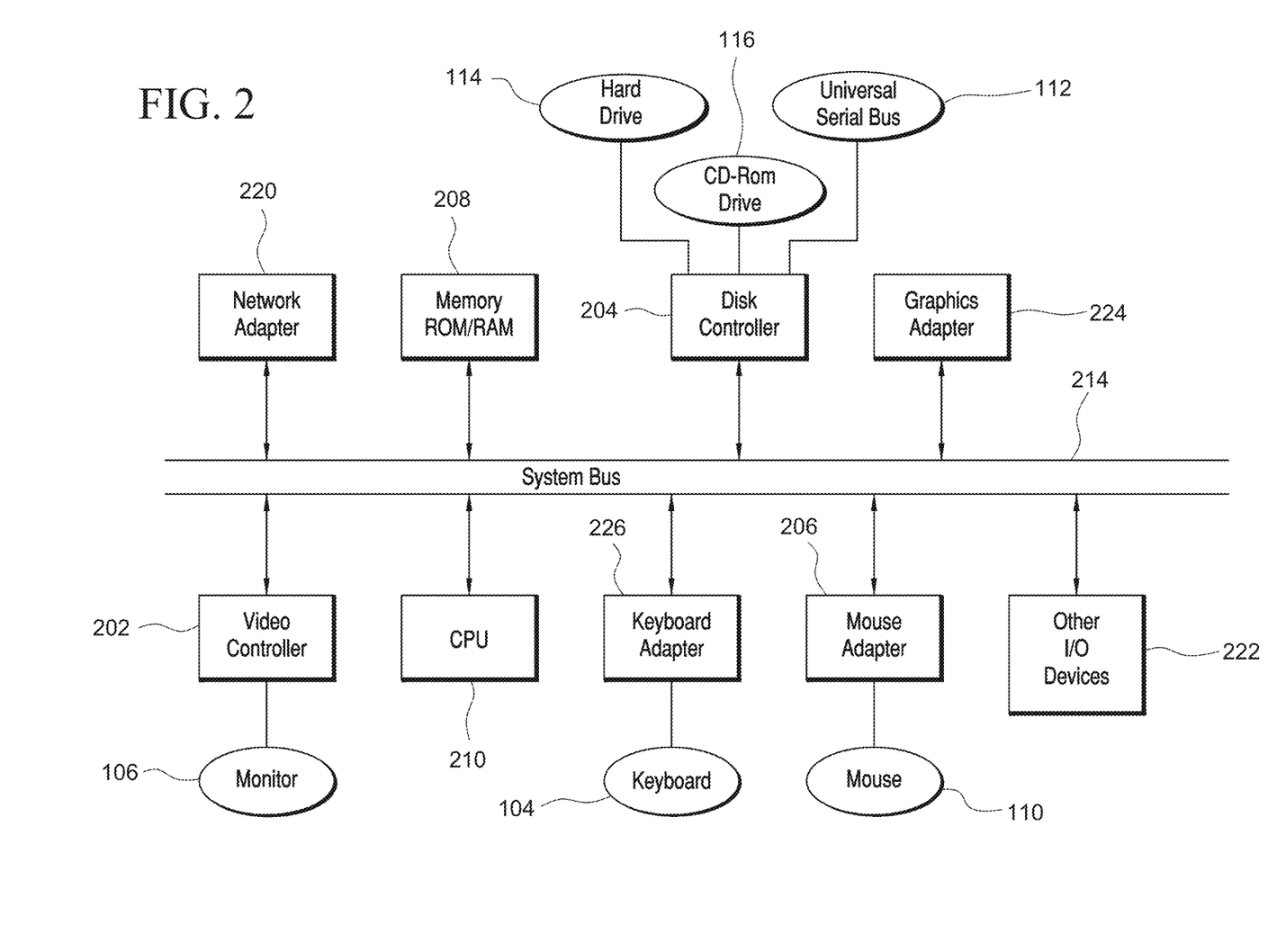
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
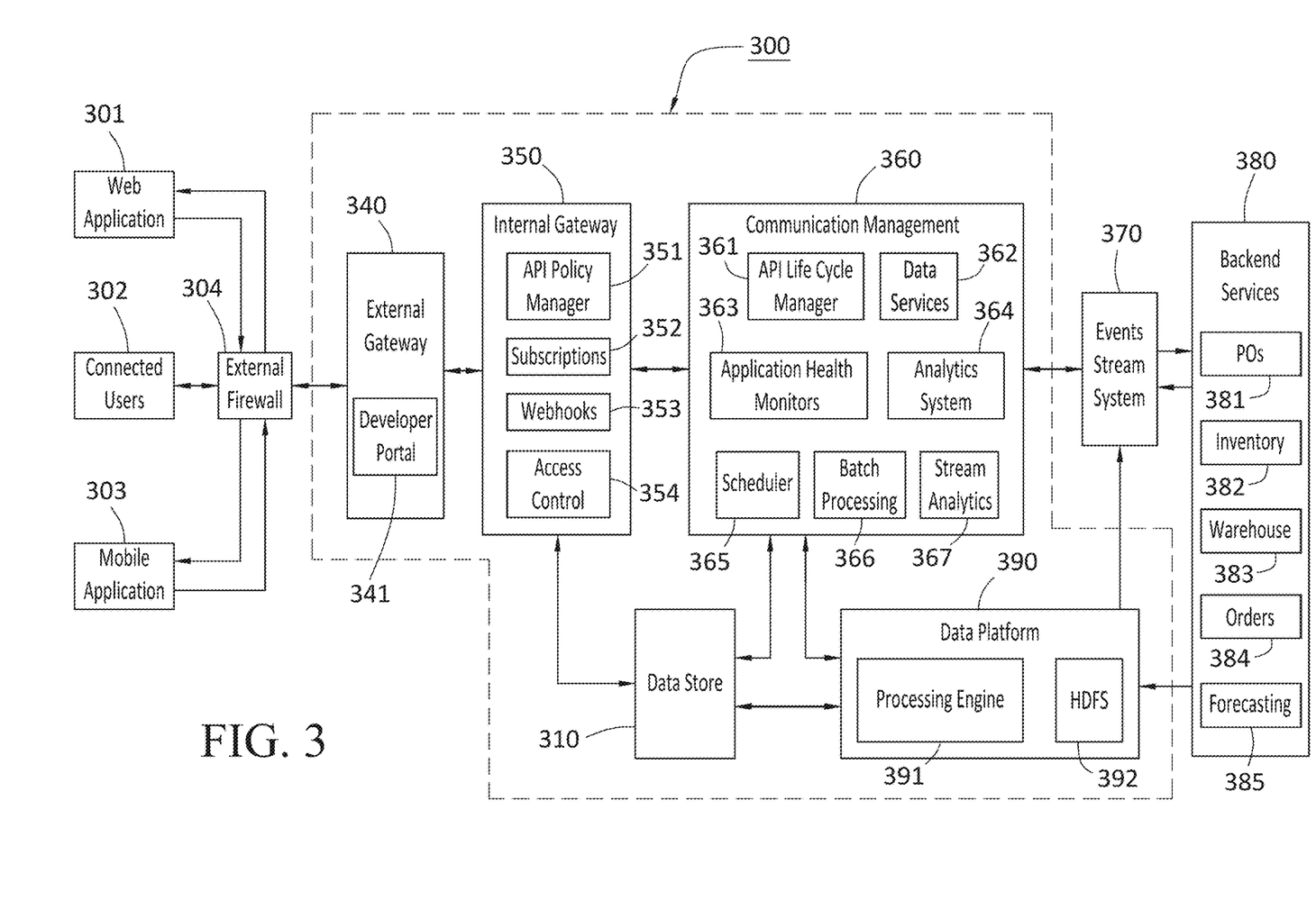
FIG. 3 illustrates a block diagram of a system, showing an exemplary integrated gateway platform for fulfillment services, according to an embodiment.

Turning ahead in the drawings, FIG. 3 illustrates a block diagram of a system 300 showing an exemplary integrated gateway platform for fulfillment services, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include an external gateway 340, an internal gateway 350, a communication management system 360, a data platform 390, and/or a data store 310. External gateway 340, internal gateway 350, communication management system 360, data platform 390, and/or data store 310 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of external gateway 340, internal gateway 350, communication management system 360, data platform 390, and/or data store 310.

In some embodiments, external gateway 340 and/or internal gateway 350 can be in data communication through a network, such as the Internet, with one or more user computers, such as a web application 301, connected users 302, and/or a mobile application 303. The network can be a public or private network. In some embodiments, web application 301, connected users 302, and/or mobile application 303 can be used by users, such as sellers, vendors, third party users and/or other suitable users. In some embodiments, web application 301 and mobile application 303 can include a two-way communication system of transmission with the integrated gateway platform, such as the integrated platform for fulfillment services. Such two-way communications can include sending requests and/or receiving responses to the request (e.g., updates, notifications, and/or other suitable responses) using the integrated gateway platform for fulfillment services. In various embodiments connected users 302 can include a one-way communication system with the integrated gateway platform for fulfillment services. In some embodiments, a one-way communication also can require a subscription type service that can allow the users to automatically receive notifications from the integrated gateway platform for fulfillment services. Connected users 302 can set up parameters and/or pre-determined rules to receive such notifications and/or other suitable types of communications as part of a user profile and/or a subscription service. For example, a connected user (e.g., 302) can set up a user profile accessed by a subscription to automatically receive notifications for specific items, events, and/or occurrences during a period of time. In many embodiments, external gateway 340 and/or internal gateway 350 can provide one or more external firewall systems, such as external firewall system 304, and/or front-end interfaces for one or more sites (e.g., websites), such as backend services 380.

In some embodiments, an internal network that is not open to the public can be used for communications between external gateway 340, internal gateway 350, communication management system 360, data platform 390, and/or data store 310 within system 300. Accordingly, in some embodiments, communication management system 360, data platform 390, and/or data store 310 within system 300 (and/or the software used by such systems) can refer to a back end of system 300, which can be operated by an operator and/or administrator of system 300, and external gateway 340 and/or internal gateway 350 (and/or the software used by such system) can refer to a front end of system 300, and can be accessed and/or used by one or more users, such as web application 301, connected users 302, and/or mobile application 303, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers, such as web application 301, connected users 302, and/or mobile application 303 can be desktop computers, laptop computers, a mobile device, and/or other endpoint devices used by one or more users. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons. Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, external gateway 340, internal gateway 350, communication management system 360, data platform 390, and/or data store 310 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to external gateway 340, internal gateway 350, communication management system 360, data platform 390, and/or data store 310, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of external gateway 340, internal gateway 350, communication management system 360, data platform 390, and/or data store 310. In a similar manner, the processors and/or the non-transitory computer-readable media can be local and/or remote to each other.

Meanwhile, in many embodiments, external gateway 340, internal gateway 350, communication management system 360, data platform 390, and/or data store 310 also can be configured to communicate with and/or include one or more databases, such as data store 310, and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between external gateway 340, internal gateway 350, communication management system 360, data platform 390, and/or data store 310 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, external gateway 340, internal gateway 350, communication management system 360, data platform 390, and/or data store 310 can be a general-purpose computer or a special-purpose computer programmed to perform specific functions and/or applications.

In several embodiments, external gateway 340 can receive an online data transmission (e.g., communication) from web application 301, connected users 302, and/or mobile application 303. In some cases, the data transmission can be a request, a purchase order, item information for an online catalog, and/or other suitable communications with backend services 380. In many embodiments, receiving data transmissions from web application 301, connected users 302, and/or mobile application 303 can be from external firewall system 304. In some cases, data transmissions can be directly received by external gateway 340 without passing through external firewall system 304. After authorizing a source of the online data transmission, in several embodiments, external gateway 340 can transmit the online data transmission to internal gateway 350 for further authentication and processing. In many cases, the source of the online data transmission can include an internet protocol (IP) packet of a computing device, such as web application 301, connected users 302, and/or mobile application 303.

In some cases, external gateway can include a developer portal 341 that can connect API (application programming interface) publishers with API subscribers. The developer portal 341 can enable self-service API publishing and allow API users to access other APIs.

In various embodiments, internal gateway 350 can receive data transmissions from external gateway 340. In some embodiments, internal gateway 350 also can transmit responses to external gateway 340 for transmission to user computers, such as web application 301, connected users 302, and/or mobile application 303. In several embodiments, internal gateway 350 can receive API calls from a data store 310. In many embodiments, internal gateway 350 can transmit API calls to data store 310. In several embodiments, internal gateway 350 can implement access restrictions to limit access of particular data transmissions received from external gateway 340. In some embodiments, internal gateway 350 can transmit data transmissions to communication management system 360.

In some embodiments, external gateway 340 can read API configurations, associated policies, rules, and metadata that can be accessed from a policy manager, such as an API policy manager 351 as used in internal gateway 350. In many embodiments, internal gateway 350 can include API policy manager 351, a subscription system 352, a webhook subscription system 353, an access control system 354, and/or other suitable systems.

In several embodiments, API policy manager 351 can include a configuration and administration policy, an access restriction policy, an authentication policy, a transformation policy, a rate limiting policy, and/or other suitable policies. In some embodiments, the configuration and administration policy can conditionally apply policy statements based on an evaluation of Boolean expressions.

In some embodiments, subscription system 352 can implement a subscription service to provide users (e.g., subscribers) with on-demand access (e.g., use) to the integrated gateway platform. In many embodiments, subscription system can allow authorized users via a valid subscription (e.g., token) access to the resources published and approved by providers, such as sellers, retailers, third parties, and other suitable providers. In some embodiments, users can transmit requests to the integrated gateway platform using the subscription service. In many embodiments, users can receive responses to previously transmitted requests from the integrated gateway platform. In several embodiments, users can set up subscriptions to subscribe to receive notifications in real-time and/or batched (e.g., micro batched). In various embodiments, users can automatically receive notifications in real-time and/or batched.

In various embodiments, webhook subscription system 353 can implement a webhook subscription service that can automatically deliver data and/or notifications in real-time to users. In some embodiments, users can set up a webhook subscription to generate an automated call from a server triggered when one or more pre-determined events occurs in real-time.

In many embodiments, the access restriction policy can include limiting a call rate (e.g., API call) using a subscription, a key, a rule, and/or using other suitable limiting devices. In several embodiments, an access restriction policy also can include restricting a caller IP (Internet Protocol) address of a single seller, multiple sellers, and/or subscription holders based on one or more rules. In various embodiments, an authentication policy can be implemented to verify a valid user (e.g., seller), a valid subscription, a valid webhook subscription, and/or other suitable authentication devices.

In several embodiments, access control system 354 can include a mechanism that can configure and limit access to application resources for each user. In some embodiments, a user can be a single user, a subscription user, a webhook user, and/or any suitable entity. In many embodiments, a user can send a request intended for one or many resources, such as backend services 380. Conventionally, a user can be pre-approved for a subscription (e.g., token) as an authorized source.

In some embodiments, communication management system 360 can include an API life cycle manager 361, a data services system 362, an application health monitor 363, an analytics system 364, a scheduler 365, a batch processing system 366, a stream analytics system 367, and/or other suitable systems. In several embodiments, communication management system 360 can receive data transmissions from internal gateway 350. In many embodiments, communication management system 360 can make API calls to data store 310 and vice versa. In some embodiments, communication management system can transmit data communications to events stream system 370. In many cases, events stream system 370 can transmit data transmission to backend services 380 and receive responses from backend services 380. In some cases, backend services can transmit responses to data platform 390 for processing instructions in the responses.

In many embodiments, API life cycle manger 361 can track incoming calls and/or outgoing responses. In some embodiments, API life cycle manager 361 also can save the incoming calls and/or outgoing responses to a persistence store (e.g., database). In various embodiments, API life cycle manager 361 can prevent the information from being dropped once the incoming calls and/or the outgoing responses are stored in the persistence store. API life cycle manager 361 can support ordering and idempotency (e.g, the same outcome each time an operation is executed). Further, a framework for API life cycle manager 361 can be built using schedulers, distributed processing nodes, SQL (Structured Query Language) servers, Kafta streams, and/or other suitable life cycle elements.

In some embodiments, data services system 362 can track user requests to send to events stream system 370 that can send data requests to one or more services in backend services 380. In many embodiments, application health monitors 363 can be integrated with Elasticsearch for visibility into background performance metrics, such as API calls, latency, error rates, and/or other suitable performance metrics. In several embodiments, analytics system 364 can execute system analytics as part of communication management system 360. In various embodiments, scheduler 365 can be implemented with a reconciliation framework used to track data accuracy and reliability as part of API policy manager 351. In some embodiments, batch processing system 366 can implement a micro batching system to transmit multiple data transmissions received from users to one or more back end services.

In various embodiments, stream analytics system 367 can transform data received from data store 310 into dashboards reporting on a status of one or more elements of system 300. Stream analytics system 367 can make API calls to events stream system 370, data platform 390, data store 310 and vice versa.

In some embodiments, data platform 390 can process instructions received by backend services 380 in response to the data communications. In several embodiments, data platform 390 can process responses (e.g., requests, instructions) from backend services 380 by using a processing engine 391 and/or by interacting with a Hadoop Distributed File System (HDFS) 392. In various embodiments, data platform 390 can transmit API calls to data store 310 to store the data processed by processing engine 391 and/or HDFS 392 in data platform 390.

In many embodiments, data store 310 can store data received by data platform 390, API calls from communication management system 360, and/or internal gateway 350, and vice versa. In some embodiments, data store 310 can be accessed by data platform 390, communication management system 360, and/or internal gateway 350.

In various embodiments, events stream system 370 can navigate a continuous flow of data, events, event objects, and/or other suitable information from one or more components within communication management system 360 to one or more components in backend services 380. Event stream system 370 can process and/or analyze data streaming from one device to another. In various embodiments, event stream system 360 can operate at an instantaneous rate upon receipt of data from hundreds of thousands of connected devices, IoT (Internet of things system), and/or other suitable sensors. In several embodiments, event stream system 360 can process a continuous flow of data in real-time. In some embodiments, event stream system 360 also can receive responses from one or more components within backend services 380 and transmit the responses back to users using the integrated gateway platform, such as an integrated platform for fulfillment services. In various embodiments, event stream system 360 can receive data from data platform 390 and process the continuous flow of data to an intended system, such as communication management system 360 and/or backend services 380. In several embodiments, event stream system 360 can operate as a publish-subscribe messaging system, such as Apache Kafka.

In many embodiments, backend services 380 can include various services and subsystems of services, such as a purchase order (PO) system 381, an inventory system 382, a warehouse system 383, an order system 384, a forecasting system 385, and/or other suitable backend services. In several embodiments, users can send targeted requests using the integrated gateway platform, such as an integrated gateway platform for fulfillment services to backend services 380. Such user requests can include purchase orders from users that can be transmitted to PO system 381. User requests can additionally include communications related to inventory, which can be directed to inventory system 382. Additionally, user requests also can include communications to and/or from warehouse system 383. User requests further can include orders for one or more items and/or services directed to order system 384. User requests also can include communications related to forecasting an amount of items and/or services to forecasting system 385.

Figure 4:
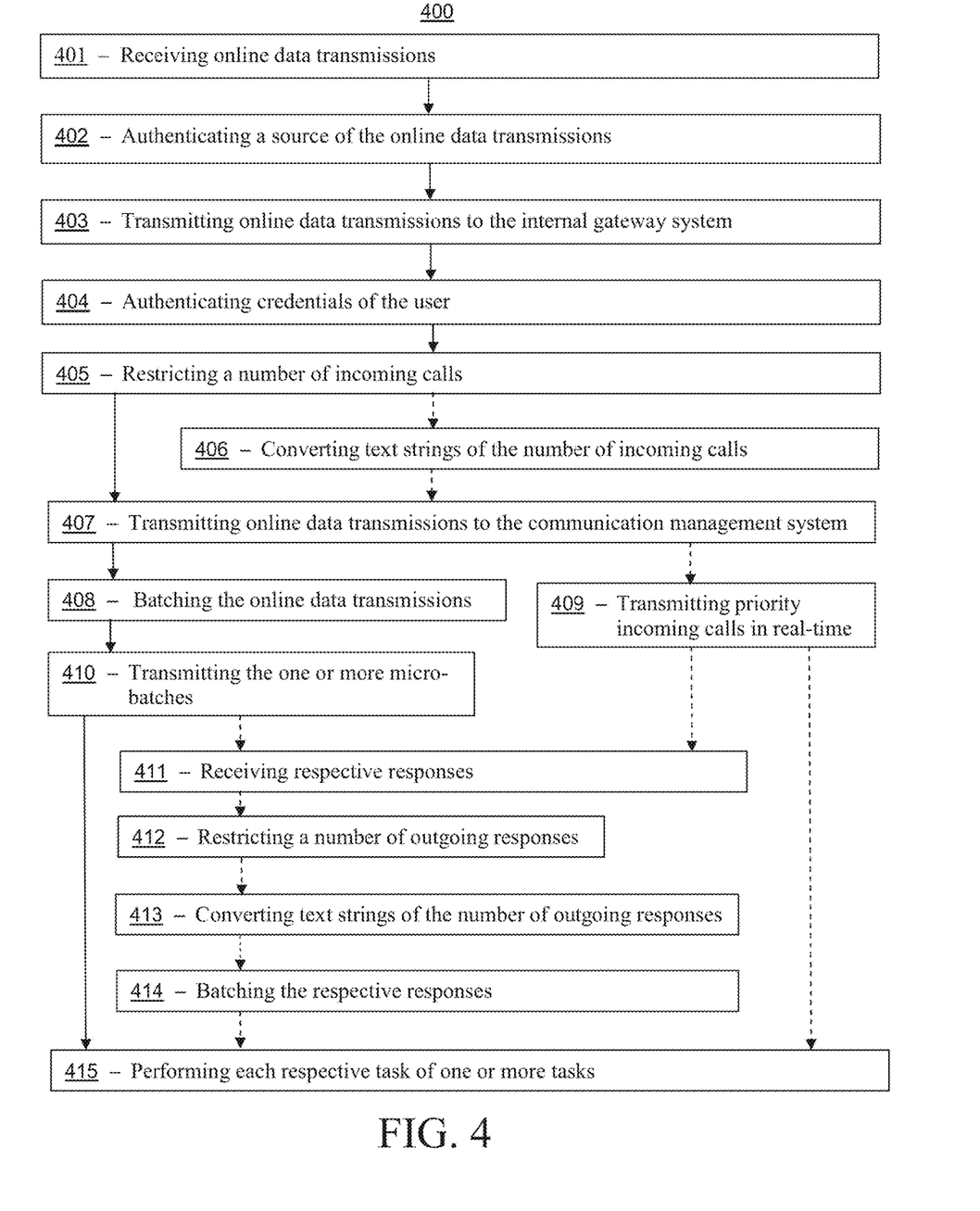
FIG. 4 illustrates a flow chart of a method, according to another embodiment.

Turning ahead in the drawings, FIG. 4 illustrates a flow chart for a method 400, according to another embodiment. In some embodiments, method 400 can be a method of using an integrated gateway platform for fulfillment services. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as external gateway 340, internal gateway 350, communication management system 360, data platform 390, and/or data store 310. The processor(s) can be similar or identical to the processor(s) described above with respect to computer system 100 (FIG. 1).

Referring to FIG. 4, method 400 can include a block 401 of receiving, by an external gateway system, online data transmissions from a user computing device of a user. The external gateway system can be similar or identical to external gateway 340 (FIG. 3). The user computing device can be similar or identical to as web application 301, connected users 302, and/or mobile application 303 (FIG. 3). In a number of embodiments, the external gateway system can provide a controlled access of online data transmission to backend services, such as backend services 380 (FIG. 3).

In many embodiments, communications (e.g., data transmissions) from users, such as web application 301 (FIG. 3), connected users 302 (FIG. 3) and/or mobile application 303 (FIG. 3), can be intercepted by an external firewall system 304 (FIG. 3) to monitor incoming and outgoing network traffic based on security rules defining a trusted network and an untrusted network. In several cases, the external firewall system 304 (FIG. 3) can conduct a first level of access restriction and/or limits prior to the data transmission being transmitted through external gateway 340 (FIG. 3). In various embodiments, users can include single users, subscription users, webhook users, and/or other suitable types of users. In some embodiments, connected users can include webhook subscriptions (e.g., a web socket) that permit the user to automatically receive notifications without having to make numerous API calls. In several embodiments, connected users can continuously track data in real-time since most webhook subscriptions can be set up to remain continuously engaged requiring no additional authorization step after initial authentication has been granted.

In many embodiments, method 400 also can include a block 402 of authenticating, by the external gateway system, that a source of the online data transmissions matches the user computing device. In several embodiments, the online data transmissions can include internet protocol (IP) packets associated with the user computing device. In some embodiments, the external gateway system can be integrated with an internal or external authorization server for token validation, such as IAM (Identity and Access Management) and/or other suitable authentication systems.

In some embodiments, method 400 further can include a block 403 of transmitting, by the external gateway system, the online data transmissions to an internal gateway system. The internal gateway system can be similar or identical to internal gateway 350 (FIG. 3).

In various embodiments, method 400 also can include a block 404 of authenticating, by the internal gateway system, credentials of the user as a pre-authorized user. In several embodiments, authenticating credentials of the user can include verifying a user identification, such as using passwords, PINs, keys, token devices, and/or any other suitable identification device. In many embodiments, authenticating credentials of the user can be implemented by through internal gateway 350 (FIG. 3).

In some embodiments, block 404 further can include authenticating a valid subscription key of a partner subscription. In many embodiments, users can transmit data transmissions directly and/or through subscriptions. In several embodiments, users also can receive notifications through webhooks. In many embodiments, subscriptions and webhooks can provide an advantage by allowing users secure access to the resources published and approved by providers. Users also can subscribe to receive notifications real-time and/or batched. Webhook and/or subscription requests can be set up to include details specific to each user, such as authentication and authorization mechanisms, call back APIs for each resource, event, entity, data streams, batching requirements, rate limitations, message formats, content types, and/or other suitable user preferences. In many embodiments, block 404 also can include authenticating a valid subscription key of a webhook subscription.

In a number of embodiments, method 400 additionally can include a block 405 of restricting, by the internal gateway system, a number of incoming calls using a rate-limiting throttle system. Rate-limiting throttle system can be similar or identical to API policy manager 351 (FIG. 3). In some embodiments, block 405 can include applying rate limiting restrictions to data transmissions received and/or transmitted by a single user (e.g., seller) without using a subscription. Conventionally, rate limiting can include throttling the number of call back API calls based on network traffic of data transmissions. Rate limiting also can include setting a predetermined limit of data transmissions that can be processed during a period of time. Further, rate limiting numbers can be a pre-set number and/or customized via requests from users. Rate limiting can be executed at a global (e.g., user subscription) level and/or a local (e.g., user entity, or resource) level. For example, a user can transmit data transmissions intended for more than one backend service in a single micro-batch determined by using the rate limiting throttle system.

In many embodiments, rate limiting for call back APIs can include leveraging event streams, (e.g., Kafka event streams) with a custom partitioning strategy. For example, a Webhook dispatcher system can consume data from data transmissions and/or from an events stream by assigning a separate user consumer thread to a dedicated partition. A core processing layer can assign one or more dedicated partitions to each subscription and/or user based on particular and/or respective rate limiting thresholds. For example, if an average latency is 100 milli seconds (ms) for one call back API, then 10 call backs can be received and/or transmitted in 1 second per subscription and/or per user. If a particular user threshold is 20 TPS (transactions per second), then 2 partitions can be assigned to that user. In various embodiments, events consumption from each partition can be independent. In many embodiments, using a separate consumer thread can control the intake flow of consumers from each partition and limit the intake flow by counting how many events a specific consumer (e.g., entity) processes per second.

In a number of embodiments, based on the total number of seller subscriptions, a configurable number of partitions to each seller can be calculated and assigned where no two sellers can get assigned to the same partition. In many embodiments, the total number of seller subscriptions also can include throughput requirements that also can be used to calculate and assign the configurable number of partitions to each seller in a way that no two sellers can get assigned to the same partition. For example, some sellers can have less than millions of items to sell, such as in the case of a seller receiving a few transactions per second and/or where a seller cannot horizontally scale the number of transactions for processing, can use a single partition assignment approach.

Whereas, larger sellers that can have millions of items to sell and/or can horizontally scale the number of transactions for processing, can use the partition assignment approach that can be based on the call back API transaction latencies and/or a total number of events.

In several embodiments, block 405 further can include applying a usage quota for each respective partner subscription and/or each respective webhook subscription. In some embodiments, an access restriction policy can be used to set a usage quota implementing terms in a subscription, using a subscription key, based on one or more rules. One or more rules of a usage quota can include monitoring a pre-determined number of requests and/or other suitable usage communications received by a user based on a period of time. One or more rules of a usage quota also can include monitoring a pre-determined number of responses and/or other suitable usage communications transmitted by a user based on a period of time.

In some embodiments, after block 405, method 400 optionally can include a block 406 of converting text strings of the number of incoming calls from a JavaScript Object Notation (JSON) format to an extensible markup language (XML) file. In several embodiments, incoming calls can be monitored based on a predetermined number of calls using the rate throttle limiting approaches in blocks 405-406.

In many embodiments, after blocks 405 and/or 406, method 400 also can include a block 407 of transmitting, by the internal gateway system, the online data transmissions to a communication management system. The communication management system can be similar or identical to communication management system 360. In some embodiments, the online data transmissions can include a predetermined number of transmissions marked (e.g., tagged) for micro batching. In many embodiments, online data transmissions can include priority incoming calls marked (e.g., tagged) for transmission in real-time, such as the approach used in block 409, described below.

In many embodiments, block 407 of transmitting, by the internal gateway system, online data transmissions to a communication management system can include using elements for micro batching, such as scheduler 365 and batching processing system 366 of communications management system 360 (FIG. 3). In several embodiments, transmitting online data transmissions can include a streaming approach using stream analytics system 367 of communications management system 360, which can be used for steaming data transmissions in real-time, such as priority incoming call in block 409 (described below) and/or priority outgoing responses.

In several embodiments, method 400 further can include a block 408 of batching, by the communication management system, the online data transmissions into one or more micro-batches based on one or more rules. In various embodiments, the one or more rules can include applying a predetermined threshold to the number of incoming calls for batching the number of incoming calls into at least one micro-batch of the one or more micro-batches. For simplicity, micro batch processing can process a predetermined number of data transmissions (e.g., chunks of data) in batches keeping each batch independent. Micro batching also can provide users with a capability to receive batched and/or aggregated events by providing one or more configurable intervals that can be time bound and/or event size bound instead of granular events. For example, given a particular time of receiving inbound shipments into warehouses, there can be instances in which, for every item received by a backend service, a receipt event (e.g., an outbound response) can be performed. In many cases, a manual approach can include inbound operation specialists that can scan the units received for each seller item. Upon the quantity getting scanned, a receipt event can be triggered, which in turn can be published to sellers (e.g., users). Sellers often use such an approach to assist in reconciling received data with internal data of a seller. Further, given 1,000 units of an item received over a period of two minutes. Those 1,000 units can be transmitted and/or processed at the same time, which can overwhelm a system and/or result in data loss. In many embodiments, micro batching can batch data transmissions in time intervals (e.g., batch interval of 1 minute), such as a batch 1 (e.g., time 1) and batch 2 (e.g., time 2), and so forth. In some embodiments, micro batching can batch two batches in a sequence and aggregate the data into one event per batch per item for each user (e.g., seller), and the user can receive two events each having a quantity of 500 units.

An advantage to using micro batching can be shown by a significant reduction in resource consumption for a user and/or one or more backend services. Micro batching and single-event processing (e.g., streaming in real-time) generally do not happen at the same time, as each transmission process can be performed independently from one another in single-event processing. In many embodiments, micro batching can be switched to single-event processing and vice versa at any given period of time. In some embodiments, micro batching transmissions can be dependent on whether particular events to be transmitted can be aggregated without information loss.

Figure 5:
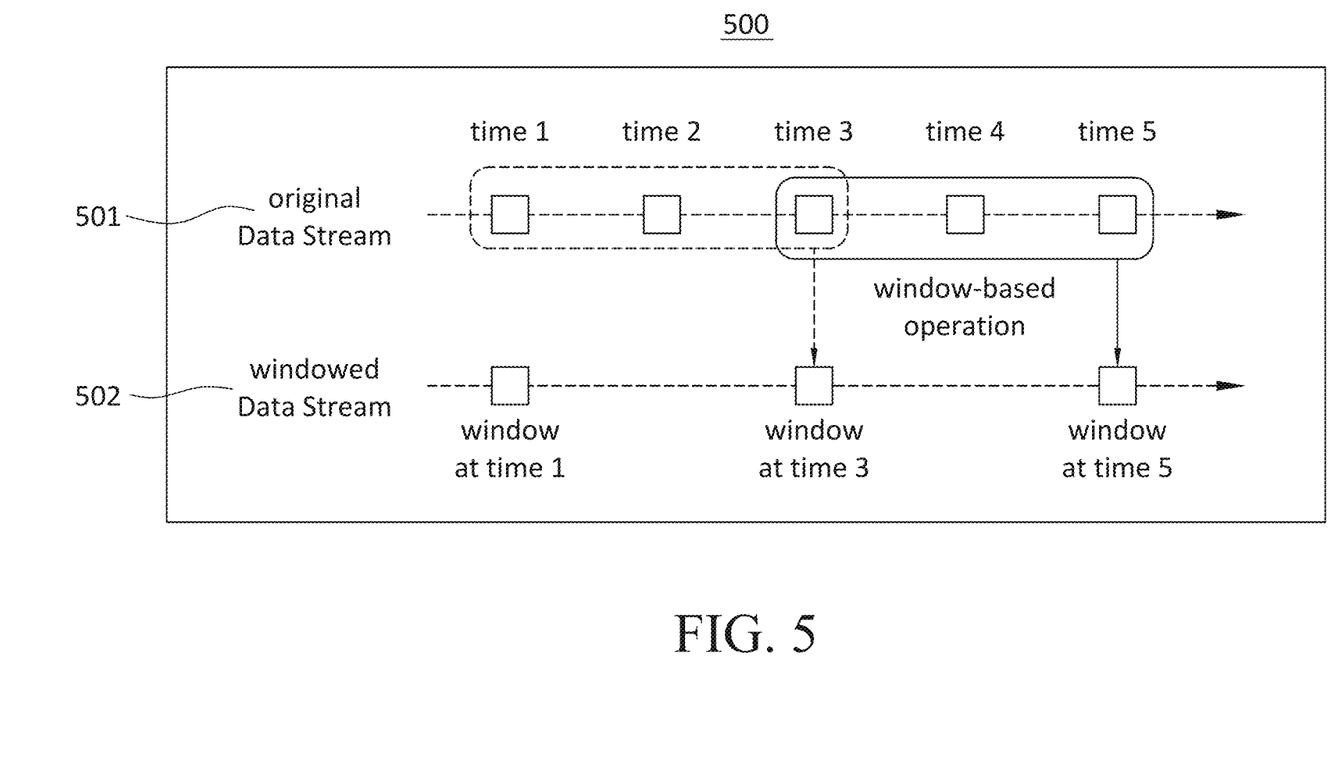
FIG. 5 illustrates a sequence diagram of exemplary sequences in an original data stream and a windowed data stream.

Turning ahead in the drawings, FIG. 5 illustrates a sequence diagram of exemplary sequences 500 in an original data stream 501 and a windowed data stream 502. Original data stream 501 receives a micro-batch at a time interval marked as time 1, and other micro-batches at other time intervals marked as time 2, time 3, time 4, and time 5, respectively. Windowed data stream 502 shows that the micro-batches received at time 1, time 2, and time 3 in original data stream 501 can be captured by a first window at time 3, to avoid data transmissions being lost or dropped during micro batching. The first window at time 3 can be transmitted and/or received through event stream 370 (FIG. 3). Additionally, windowed data stream 502 shows that the micro-batches received at time 3, time 4 and time 5 can be captured as a second window at time 5. Sequences 500 show a technique for aggregating data received and micro batched, which can be transmitted as one event per user (e.g., seller).

Returning back to FIG. 4, block 408 of batching, by the communication management system, the online data transmissions into one or more micro-batches based on one or more rules can include using one or more subsystems to perform the micro processing approach. In various embodiments, the one or more subsystems can include a core processing layer and a webhook dispatcher. Core processing layer can consume events from event stream (e.g, events stream system 370 (FIG. 3)), perform data translations, mapping, validation, transaction marking with persistence into data store, and/or other suitable core processing activities. In various embodiments, events can be triggered as per the specifications of users (e.g., sellers) and transmitted (e.g., published) to an events stream with custom partitioning linked to each user so that the events for same user, seller, entity, and/or resource ID can go to the same partition.

Webhook dispatcher can consume data streams and then aggregate the data by using time-based windowing algorithms. In aggregating operations, an in-memory and/or a local windowing state store can be used to store current aggregation results per time window. Older records in the state store can be purged after expiration of a predetermined time window retention period, which, in a number of embodiments, can keep data transmissions up-to-date.

In several embodiments, events stream system 370 (FIG. 3) can include an event bus to which events can continuously be transmitted (e.g., published) in real-time.

In many embodiments, backend services 380 (FIG. 3) can be part of the micro batching approach by receiving the incoming data transmissions and transmitting the outgoing responses. Backend services 380 (FIG. 3) can include source systems from where events can be generated for actions, status changes, updates, and/or other suitable actions.

In a number of embodiments, after block 407, block 408 further can include batching the number of incoming calls into at least one micro-batch of the one or more micro-batches based on a predetermined transmission frequency for transmitting to the events stream system. The events stream system can be similar or identical to events stream system 370 (FIG. 3) Such a predetermined transmission frequency can be determined using the rate limiting throttle system for micro batching and data streaming events in real-time.

In several embodiments, also after block 407, method 400 optionally can include a block 409 of transmitting priority incoming calls in real-time to the one or more respective backend services using the events stream system. In some embodiments, transmitting priority incoming calls in real-time can be transmitted independently from micro-batches. In many embodiments, priority incoming calls can include real-time data for the one or more respective backend services. In a number of embodiments, priority incoming calls are not batched into micro-batches.

In many embodiments, after block 408, method 400 also can include a block 410 of transmitting, by the communication management system, the one or more micro-batches to one or more respective backend services using an events stream system. The events stream system can be similar or identical to events stream system 370 (FIG. 3). The backend services can be similar or identical to backend services 380 (FIG. 3).

In some embodiments, after block 410, method 400 also can optionally include a block 411 of receiving, at a data platform, respective responses transmitted from the one or more respective backend services in response to each one of the one or more micro-batches. The data platform can be similar or identical to data platform 390 (FIG. 3). In many embodiments, respective responses from backend services can be processed using processing engine 391 that can be stored in data store 310 (FIG. 3). In several embodiments, block 403 also can include receiving outgoing responses from the internal gateway.

In several embodiments, after block 412, method 400 optionally can include a block 412 of restricting a number of outgoing responses to the user computing device using the rate-limiting throttle system. In various embodiments, restricting the number of outing responses can include micro batched responses and/or streaming responses.

In various embodiments, after block 412, method 400 optionally can include a block 413 of converting text strings of the number of outgoing responses from the XML, file to the JSON format. In various embodiments, outgoing responses can be monitored based on a predetermined number of calls using the rate throttle limiting approaches in blocks 412-414.

In some embodiments, after block 413, method 400 optionally can include a block 414 of batching the respective responses from the one or more respective backend services into one or more second micro-batches. In some embodiments, batching the respective responses can be based on applying a predetermined threshold to a number of the respective responses from the one or more respective backend services. In the same or other embodiments, batching the respective responses can be based on a predetermined transmission frequency for responding to the user computing device. In some embodiments, blocks 408 and 410 (and, in some embodiments, one or more of blocks 411, 412, 413, or 414) can occur in parallel with or instead of block 409.

In several embodiments, method 400 further can include a block 415 of performing each respective task of one or more tasks, using the data platform, based on the respective responses from the one or more respective backend services. In many embodiments, block 415 can occur after block 410 and also can occur after one or more of blocks 409, 411, 412, 413, and 414.

As an example, the one or more tasks of block 415 can include using one of the backend micro services, such as an inventory management system (IMS), which can be used as a source of truth (SOT) for an items inventory. The backend micro services can be similar or identical to backend services 380 (FIG. 3). The IMS can be similar or identical to inventory system 382 (FIG. 3). In this example, whenever an item can be shipped from a fulfillment center and/or can be received at a fulfillment center and/or can be reserved upon a customer purchase, the IMS can send an inventory update event to a core platform, such as the data platform. Such a core platform can consume data streams and can aggregate the data by using time based windowing algorithms.

In many embodiments, the data platform can transmit the respective responses to the communication management system for further transmission to the user. In various embodiments, the data platform can transmit the respective responses to the events stream system for further transmission to the user. In many embodiments, users can receive responses and/or notifications via subscription services, webhook subscription, and/or other suitable communication devices. In several embodiments, block 403 also can include transmitting the outgoing responses received from the internal gateway to the user computers.

Returning to FIG. 3, external gateway 340 can at least partially perform block 401 (FIG. 4) of receiving, by an external gateway system, online data transmissions from a user computing device of a user, block 402 (FIG. 4) of authenticating, by the external gateway system, that a source of the online data transmissions matches the user computing device, and/or block 403 (FIG. 4) of transmitting, by the external gateway system, the online data transmissions to the internal gateway system.

In many embodiments, external gateway 340 can at least partially perform accessing a web server (e.g., internet) to send instructions to user computers, such as web application 301, connected users 302, and/or mobile application 303, based on information received from communication management system 360. In some embodiments, internal gateway 350 can at least partially perform access a web server (e.g., internet) for information used to authenticate the source of the online data transmissions, and/or other suitable information.

In several embodiments, internal gateway 350 can at least partially perform block 404 (FIG. 4) of authenticating, by an internal gateway system, credentials of the user as a pre-authorized user, block 405 (FIG. 4) of restricting, by the internal gateway system, a number of incoming calls using a rate-limiting throttle system, block 406 (FIG. 4) of converting text strings of the number of incoming calls from the XML file to the JSON format, block 412 (FIG. 4) of restricting a number of outgoing responses to the user computing device using the rate-limiting throttle system, and/or block 413 (FIG. 4) of converting, by the internal gateway system, text strings of the number of outgoing responses from the XML, file to the JSON format.

In some embodiments, internal gateway 350 can at least partially perform access a web server (e.g., internet) for information used to authenticate user credentials and/or other suitable information.

In some embodiments, communication management system 360 can at least partially perform block 407 (FIG. 4) of transmitting, by the communication management system, the one or more micro-batches to one or more respective backend services using a events stream system, block 408 (FIG. 4) of batching, by a communication management system, the online data transmissions into one or more micro-batches based on one or more rules, block 409 (FIG. 4) of transmitting priority incoming calls in real-time to the one or more respective backend services using the events stream system, block 410 (FIG. 4) of transmitting, by the communication management system, the one or more micro-batches to one or more respective backend services using an events stream system, and/or block 414 (FIG. 4) of batching the respective responses from the one or more respective backend services into one or more second micro-batches.

In a number of embodiments, data platform 390 can at least partially perform block 411 (FIG. 4) of receiving, at a data platform, respective responses transmitted from the one or more respective backend services in response to each one of the one or more micro-batches, and/or block 415 (FIG. 4) of performing each respective task of one or more tasks, using the data platform, based on the respective responses from the one or more respective backend services.

In several embodiments, data store 310 can at least partially perform gathering data to provide to internal gateway 350, communication management system 360, and/or data platform 390.

In many embodiments, the techniques described herein can provide several technological improvements. In some embodiments, the techniques described herein can provide for automatically providing a streamlined approach for processing over approximately two hundred requests per second and over approximately two thousand notifications per second using an integrated gateway platform for fulfillment services. In many embodiments, the techniques described herein can beneficially transmit requests and responses (e.g., data transmissions) by streaming approaches in real-time for priority data transmissions. In a number of embodiments, the techniques described herein can advantageously enable efficient utilization of micro batching large numbers of data transmissions received by the users, which can beneficially result in a reduction in processor use and memory cache.

In a number of embodiments, the techniques described herein can advantageously provide a consistent user experience by dynamically transmitting hundreds of thousands of data transmissions to multiple sources for each user without dropping data or data transmissions. For example, over two million items and item updates can be received from sellers and/or third-party vendors in one day. In some embodiments, the techniques provided herein can beneficially reduce computing resources and costs while continuing to offer real-time updates based on one or more rule implemented for micro batching or streaming priority data transmissions. For example, an online catalog can include approximately one hundred million items and/or products at any given period of time.

In many embodiments, the techniques described herein can be used continuously at a scale that cannot be handled using manual techniques. For example, the number of daily and/or monthly visits from sellers can exceed approximately ten million and/or other suitable numbers, the number of registered users to subscription services and webhook subscription the content source can exceed approximately one million and/or other suitable numbers, and/or the number of products and/or items sold on the website can exceed approximately ten million (10,000,000) approximately each day.

A number of embodiments include an integrated gateway system. The integrated gateway system can include an external gateway, an internal gateway, a communication management system, and a data platform that can be configured to perform certain acts. The acts can include receiving, using the external gateway system, online data transmissions from a user computing device of a user. The acts further can include authenticating, using the external gateway system, that a source of the online data transmissions matches the user computing device. The acts also can include transmitting, using the external gateway, the online data transmissions to the internal gateway system. The acts additionally can include authenticating, using the internal gateway system, credentials of the user as a pre-authorized user. The acts further can include restricting, using the internal gateway system, a number of incoming calls using a rate-limiting throttle system. The acts also can include transmitting, using the internal gateway system, the online data transmissions to the communication management system. The acts further can include batching, using the communication management system, the online data transmissions into one or more micro-batches based on one or more rules. The acts additionally can include transmitting, using the communication management system, the one or more micro-batches to one or more respective backend services using an events stream system. The acts also can include receiving respective responses transmitted from the one or more respective backend services in response to each one of the one or more micro-batches using a data platform. The acts further an include performing each respective task of one or more tasks, using the data platform, based on the respective responses from the one or more respective backend services.

An integrated gateway method can be implemented via execution of computing instructions configured to run at one or more processors and stored at one or more non-transitory computer-readable media. The method can include receiving, by an external gateway system, online data transmissions from a user computing device of a user. The method also can include authenticating, by the external gateway system, that a source of the online data transmissions matches the user computing device. The method further can include transmitting, by the external gateway system, the online data transmissions to the internal gateway system. The method additionally can include authenticating, by an internal gateway system, credentials of the user as a pre-authorized user. The method also can include restricting, by the internal gateway system, a number of incoming calls using a rate-limiting throttle system. The method further can include transmitting, by the internal gateway system, the online data transmissions to a communication management system. The method additionally can include batching, by the communication management system, the online data transmissions into one or more micro-batches based on one or more rules. The method also can include transmitting, by the communication management system, the one or more micro-batches to one or more respective backend services using an events stream system. The method further can include receiving, at a data platform, respective responses transmitted from the one or more respective backend services in response to each one of the one or more micro-batches. The method additionally can include performing each respective task of one or more tasks, using the data platform, based on the respective responses from the one or more respective backend services.

Various embodiments can include a system. A system can include one or more processors and one or more non-transitory computer-readable media storing computing instructions that, when executed on the one or more processors, cause the one or more processors to perform certain acts. The acts can include authenticating at least one source of online data transmissions that matches a respective computing device of a respective user. The acts also can include batching the online data transmissions into one or more micro-batches. The acts additionally can include transmitting the one or more micro-batches to one or more respective backend services. The acts further can include receiving respective responses from the one or more respective backend services in response to each one of the one or more micro-batches. The acts also can include performing each respective task of one or more tasks associated with the respective responses.

Several embodiments can include a method being implemented via execution of computing instructions configured to run at one or more processors and stored at one or more non-transitory computer-readable media. The method can include authenticating at least one source of online data transmissions that matches a respective computing device of a respective user. The method also can include batching the online data transmissions into one or more micro-batches. The method additionally can include transmitting the one or more micro-batches to one or more respective backend services. The method further can include receiving respective responses from the one or more respective backend services in response to each one of the one or more micro-batches. The method also can include performing each respective task of one or more tasks associated with the respective responses.

Although an integrated gateway platform for fulfillment services has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within external gateway 340, internal gateway 350, communication management system 360, data platform 390, and/or data store 310 (see FIGS. 3 and 5) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform operations comprising:
authenticating at least one source of online data transmissions that matches a respective computing device of a respective user;
batching the online data transmissions into one or more micro-batches;
transmitting the one or more micro-batches to one or more respective backend services;
receiving respective responses from the one or more respective backend services in response to each one of the one or more micro-batches; and
performing each respective task of one or more tasks associated with the respective responses.

2. The system of claim 1, wherein the computing instructions, when executed on the one or more processors, further cause the one or more processors to perform an operation comprising:
receiving the online data transmissions from the respective computing device of the respective user.

3. The system of claim 1, wherein the computing instructions, when executed on the one or more processors, further cause the one or more processors to perform an operation comprising:
restricting outgoing responses to the respective computing device.

4. The system of claim 1, wherein the computing instructions, when executed on the one or more processors, further cause the one or more processors to perform one or more operations comprising:
converting text strings of incoming calls from a JSON format to an XML file; or
converting text strings of outgoing responses from the XML file to the JSON format.

5. The system of claim 1, wherein the computing instructions, when executed on the one or more processors, further cause the one or more processors to perform an operation comprising:
authenticating a credential of the respective user.

6. The system of claim 5, wherein authenticating the credential of the respective user further comprises:
authenticating a valid subscription key of a webhook subscription; or
authenticating a valid subscription key of a partner subscription.

7. The system of claim 1, wherein the computing instructions, when executed on the one or more processors, further cause the one or more processors to perform an operation comprising:
restricting incoming calls by at least applying a usage quota for each respective partner subscription and each respective webhook subscription.

8. The system of claim 1, wherein batching the online data transmissions further comprises one or more of:
applying a predetermined threshold to incoming calls for batching a number of incoming calls into at least one micro-batch of the one or more micro-batches; or
batching the number of incoming calls into the at least one micro-batch of the one or more micro-batches based on a predetermined transmission frequency configured to be used to transmit the at least one micro-batch.

9. The system of claim 1, wherein the computing instructions, when executed on the one or more processors, further cause the one or more processors to perform an operation comprising:
batching the respective responses received from the one or more respective backend services into one or more second micro-batches based on one or more of:
applying a predetermined threshold to the respective responses received from the one or more respective backend services; or
a predetermined transmission frequency for responding to the respective computing device.

10. The system of claim 9, wherein the computing instructions, when executed on the one or more processors, further cause the one or more processors to perform an operation comprising:
transmitting priority incoming calls in real-time to the one or more respective backend services, wherein the priority incoming calls comprise real-time data for the one or more respective backend services, and wherein the priority incoming calls are not batched into micro-batches.

11. A method being implemented via execution of computing instructions configured to run at one or more processors and stored at one or more non-transitory computer-readable media, the method comprising:
authenticating at least one source of online data transmissions that matches a respective computing device of a respective user;
batching the online data transmissions into one or more micro-batches;
transmitting the one or more micro-batches to one or more respective backend services;
receiving respective responses from the one or more respective backend services in response to each one of the one or more micro-batches; and
performing each respective task of one or more tasks associated with the respective responses.

12. The method of claim 11 further comprising:
receiving the online data transmissions from the respective user computing device of the respective user.

13. The method of claim 11 further comprising:
restricting outgoing responses to the respective computing device.

14. The method of claim 11 further comprising:
converting text strings of incoming calls from a JSON format to an XML file; or
converting text strings of outgoing responses from the XML file to the JSON format.

15. The method of claim 11 further comprising:
authenticating a credential of the respective user.

16. The method of claim 15, wherein authenticating the credential of the respective user further comprises:
authenticating a valid subscription key of a webhook subscription; or
authenticating a valid subscription key of a partner subscription.

17. The method of claim 11 further comprising at least one of:
(a)
restricting incoming calls by at least applying a usage quota for each respective partner subscription and each respective webhook subscription;
(b)
batching the respective responses received from the one or more respective backend services into one or more second micro-batches based on one or more of:
applying a predetermined threshold to the respective responses received from the one or more respective backend services; or
a predetermined transmission frequency for responding to the respective computing device; or
(c)
transmitting priority incoming calls in real-time to the one or more respective backend services, wherein the priority incoming calls comprise real-time data for the one or more respective backend services, and wherein the priority incoming calls are not batched into micro-batches.

18. The method of claim 11, wherein batching the online data transmissions further comprises one or more of:
applying a predetermined threshold to incoming calls for batching a number of incoming calls into at least one micro-batch of the one or more micro-batches; or
batching the number of incoming calls into the at least one micro-batch of the one or more micro-batches based on a predetermined transmission frequency configured to be used to transmit the at least one micro-batch.

19. A non-transitory computer-readable medium storing instructions, wherein the instructions, upon execution by a processor, cause the processor to perform operations comprising:
authenticating at least one source of online data transmissions that matches a respective computing device of a respective user;
batching the online data transmissions into one or more micro-batches;
transmitting the one or more micro-batches to one or more respective backend services;
receiving respective responses from the one or more respective backend services in response to each one of the one or more micro-batches; and
performing each respective task of one or more tasks associated with the respective responses.

20. The non-transitory computer-readable medium of claim 19, wherein the operations further comprise:
authenticating a credential of the respective user.

* * * * *